United States Patent
Hooper, Jr. et al.

(10) Patent No.: US 8,884,452 B2
(45) Date of Patent: Nov. 11, 2014

(54) BUILDING SUNSHADE WITH INTEGRAL ELECTRIC GENERATOR

(75) Inventors: William J. Hooper, Jr., Lawrenceville, GA (US); William Ling, Norcross, GA (US); Ion-Horatiu Barbulescu, Atlanta, GA (US)

(73) Assignee: Alcoa Inc., Pittsburgh, PA (US)

( * ) Notice: Subject to any disclaimer, the term of this patent is extended or adjusted under 35 U.S.C. 154(b) by 358 days.

(21) Appl. No.: 13/483,990

(22) Filed: May 30, 2012

(65) Prior Publication Data

US 2013/0322054 A1    Dec. 5, 2013

(51) Int. Cl.
*F03D 9/00* (2006.01)
*H02P 9/04* (2006.01)

(52) U.S. Cl.
USPC .............................................. 290/44; 290/55

(58) Field of Classification Search
USPC ...................................................... 290/44, 55
See application file for complete search history.

(56) References Cited

U.S. PATENT DOCUMENTS

| | | | |
|---|---|---|---|
| 4,119,863 A | 10/1978 | Kelly | |
| 5,394,016 A * | 2/1995 | Hickey | ............................ 290/55 |
| 7,843,640 B2 | 11/2010 | Hooper, Jr. | |
| 2012/0086214 A1 | 4/2012 | Roskey et al. | |
| 2012/0097345 A1 * | 4/2012 | Rountree | ....................... 160/192 |

OTHER PUBLICATIONS

Canadian Office Action dated Apr. 23, 2014, regarding Canadian Patent Application No. 2,815,596, Canadian Intellectual Property Office, An Agency of Industry Canada, 2 pages.
Hunter Douglas Contract: Light Shelves http://www.hunterdouglascontract.com/solarcontrol/lightshelves/index.jsp?trk_semgrp=light . . . Obtained Jun. 4, 2012, 1 page.
Tubelite® Aluminate(TM) Light Shelves http://www.tubeliteinc.com/product_types/aluminate/aluminate.html. Obtained Jun. 4, 2012, 1 page.
Wausau Window and Wall Systems, Both #5048 at Greenbuild 2009, 2 pages.
YKK AP Luminance® Light Shelf System, http://www.ykkap.com/productmaster/Index.aspx?id=7213. Obtained Jun. 4, 2012, 1 page.
E-Lite(TM) Features/Benefits Projects http://www.elcocorp.com/ProductContent.aspx?SecondTab=true&product=80&line=4&typ . . . Obtained Jun. 4, 2012, 2 pages.
InLighten® (Light Shelf) Features literature EC 97911-09, Kawneer, An Alcoa Company. Feb. 2009, 14 pages.

* cited by examiner

*Primary Examiner* — Tulsidas C Patel
*Assistant Examiner* — Thomas Quigley
(74) *Attorney, Agent, or Firm* — Greenberg Traurig, LLP (57) ABSTRACT

A sun shade or light guide generates electricity via a wind-driven movable element, such as a turbine, which drives an electrical generator/alternator. The turbine and/or a fan may be interposed between shade elements for driving one or more generators. The generator may be driven directly or may be mechanically coupled to the movable element. Electricity produced by the generator may be stored in a battery and or used immediately.

18 Claims, 8 Drawing Sheets

BUILDING SUNSHADE WITH INTEGRAL ELECTRIC GENERATOR

FIELD

The present invention relates to shades for controlling solar radiation on and into buildings and more particularly to shades installed on the exterior of buildings.

BACKGROUND

Various types of shades have been utilized in the past for controlling the impact of solar radiation on buildings for the purposes of optimizing temperature and lighting conditions within a building. For example, shade structures such as metal or wood louvers, have been mounted on buildings proximate windows to provide shade from the sun, to diminish heat and glare attributable to sun exposure and to change the incident angle of the radiation to improve illumination of the building. Louvered shades may also preserve ventilation/air exchange while a the same time providing control of the heat and light associated with solar radiation. Shades have been used to reduce the amount of energy required to be expended to maintain a building at a comfortable temperature, e.g., by preventing solar heating and to thereby decrease air conditioner usage to maintain a comfortable temperature. Shades may also impact the amount of energy required to provide adequate illumination light, e.g., by enhancing the level of illumination by natural lighting, e.g., via a light shelf. Notwithstanding the energy savings achievable by the use of shades, improved and alternative shade apparatus and methods remain desirable.

SUMMARY

The disclosed subject matter relates to a light control device with a light control member capable of being positioned proximate a building and a moveable member rotatably coupled to the light control member. The moveable member is capable of moving in response to an air current. An electric generator is coupled to the movable member and is capable of generating electricity when the movable member is moved.

In accordance with another aspect of the present disclosure, the light control includes a shade capable of effecting the sunlight entering the building through an opening therein.

In accordance with another aspect of the present disclosure, the shade has a hollow accommodating the movable element.

In accordance with another aspect of the present disclosure, the movable element is a turbine with a plurality of blades extending at least partially across the hollow.

In accordance with another aspect of the present disclosure, the turbine is a squirrel cage type.

In accordance with another aspect of the present disclosure, the turbine is a fan type.

In accordance with another aspect of the present disclosure, the shade is composed of a plurality of spaced members with the hollow disposed there between and held together by a bridging member.

In accordance with another aspect of the present disclosure, the shade has an elliptical shape and the hollow has an interior curvature approximating the circumference of the circle traced by the turbine blades when the turbine is moved.

In accordance with another aspect of the present disclosure, the shade has an airfoil shape with the hollow occupying a position proximate the area of the airfoil which generates lift in response to air flow over the airfoil shape.

In accordance with another aspect of the present disclosure, the generator is coupled to an end of the turbine.

In accordance with another aspect of the present disclosure, the shade has an elliptical shape and the hollow has an interior curvature approximating the circumference of the circle traced by the turbine blades when the turbine is moved, at least one edge of shade at the conjunction of the hollow and the elliptical shape being relieved.

In accordance with another aspect of the present disclosure, the shade has an elliptical shape and the hollow has an interior curvature approximating the circumference of the circle traced by the turbine blades when the turbine is moved, the shade having at least one passage extending from the hollow to an exterior surface of the shade.

In accordance with another aspect of the present disclosure, the shade includes a mounting bracket which affixes the shade to the building at a given distance there between.

In accordance with another aspect of the present disclosure, the shade is adjustably mounted to the building to allow repositioning the shade.

In accordance with another aspect of the present disclosure, the shade is pivotally mounted at at least one end and the angle thereof relative to a surface of the building is controlled by a support of variable length.

In accordance with another aspect of the present disclosure, the generator is mounted on the shade.

In accordance with another aspect of the present disclosure, the generator is mounted on the building.

In accordance with another aspect of the present disclosure, the shade includes a motion transfer linkage.

In accordance with another aspect of the present disclosure, the motion transfer linkage includes a first pulley attached to the turbine and a second pulley attached to the generator with a belt passing between the first and second pulleys.

In accordance with another aspect of the present disclosure, the shade includes an actuator for moving the shade to a selected position.

In accordance with another aspect of the present disclosure, the shade includes a sensor responsive to energy and a controller, the sensor providing an output representative of the energy to the controller and the controller having logic which interprets the sensor output and produces a control signal to the actuator to move the shade to a position determined by the logic of the controller.

In accordance with another aspect of the present disclosure, the device includes a plurality of spaced shades and a plurality of turbine elements interposed between the plurality of spaced shades.

In accordance with another aspect of the present disclosure, the device includes a storage battery and wherein the generator is used to charge the battery.

In accordance with another aspect of the present disclosure, the device includes an electrical conversion device to convert electricity generated in one form to another form of electricity for at least one of storage and application to a load.

In accordance with another aspect of the present disclosure, the light control device includes a light guide capable of effecting the sunlight entering the building through an opening therein.

In accordance with another aspect of the present disclosure, the shade has a pair of spaced members held together by a pair of bridging members, a first bridging member coupled to the spaced members proximate one end thereof and a second bridging member coupled to the spaced members proximate a second end thereof, the pair of spaced members conjointly having an elliptical cross-sectional shape. A mounting bracket extends from the shade for mounting the shade to a building. A turbine with a plurality of blades extends at least partially across the space between the pair of members, rotatably coupled to the shade and positioned between the spaced members with the rotational axis parallel to the direction of extension of the spaced members between the first and second bridging members. Opposing surfaces of the pair of spaced members define a hollow having an interior curvature approximating the circumference of the circle traced by the turbine blades when the turbine is moved, the turbine capable of moving in response to moving air. An electric generator is coupled to the turbine, the generator capable of generating electricity when the turbine is moved.

BRIEF DESCRIPTION OF THE DRAWINGS

For a more complete understanding of the present invention, reference is made to the following detailed description of exemplary embodiments considered in conjunction with the accompanying drawings.

DETAILED DESCRIPTION OF EXEMPLARY EMBODIMENTS

Figure 1:
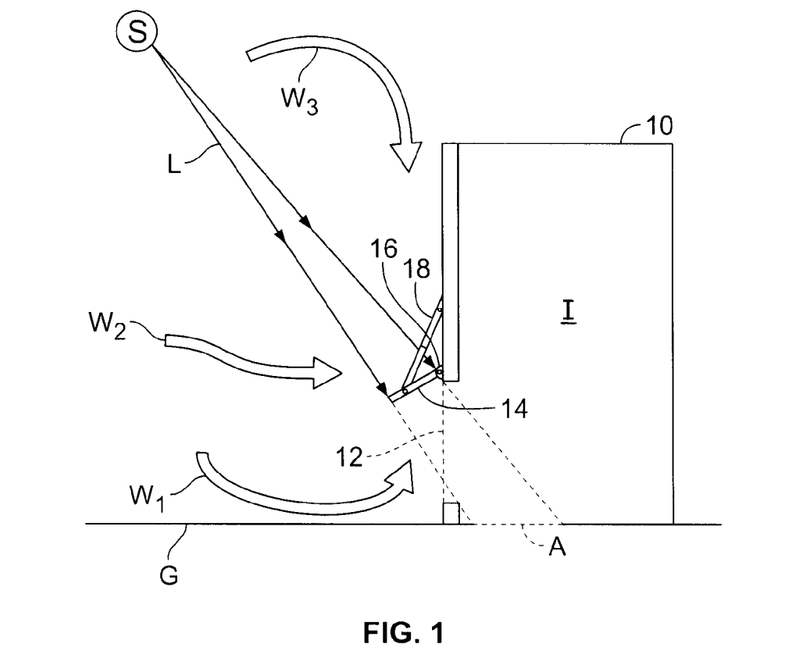
FIG. 1 is a diagrammatic view of a building with a shade.

FIG. 1 shows a building 10 with a window 12 formed from a transparent material, such as glass. A shade 14 is mounted to the building 10 proximate the window 12, such that light L from the sun S is at least partially obstructed from passing through the window 12 to the interior I of the building 10. For example, the shade 14 blocks the sun from reaching shaded area A on a floor surface in the interior I of the building 10. The shade 14 may optionally be adjustable in position relative to the sun S and the building 10 to provide a selected degree and position of shading. For example, the shade 14 may be pivotally mounted at hinge 16 and adjusted by an adjustable arm 18, e.g., a telescoping arm actuated by an electric motor via a gear and rack drive or via hydraulic actuation. Given that the atmosphere is often agitated by air currents (wind) as illustrated by arrows $W_1$, $W_2$ and $W_3$, the shade 14 is exposed to the force exerted by these air currents. The winds $W_1$, $W_2$ and $W_3$ experienced by a building 10 may be from any given direction, but a given building 10 in a given location may exhibit a tendency to experience wind from a predominant direction. For example, a building 10 on unobstructed ground G may experience wind $W_1$, which travels parallel to the ground G until it encounters the building 10, whereupon being constrained by the building 10 and the ground G, it tends to flow up the windward side of the building 10. An aspect of the present disclosure is the recognition that the air currents, e.g., $W_1$, $W_2$ and $W_3$ that impact the shade 14 can be utilized to generate electricity. Further, the shade 14 may be utilized to fulfill two functions, viz., shading and electric generation. Furthermore, the shade may be optimized for a particular installation. For example, a building which experiences predictable patterns of sun and wind exposure can be fitted with shades that are maximized to save energy resources by the selection of configuration and positioning, which may be dynamically adjustable.

FIG. 1 shows only one window, in one particular location and only one shade, but the present disclosure is applicable to any particular multiplicity and configuration of windows and shades. For example, one or more sides of an entire large building 10 may be fenestrated and/or shaded by a plurality of shades 14, with many or all shades including electric generation apparatus, as shall be described more fully below.

Figure 2:
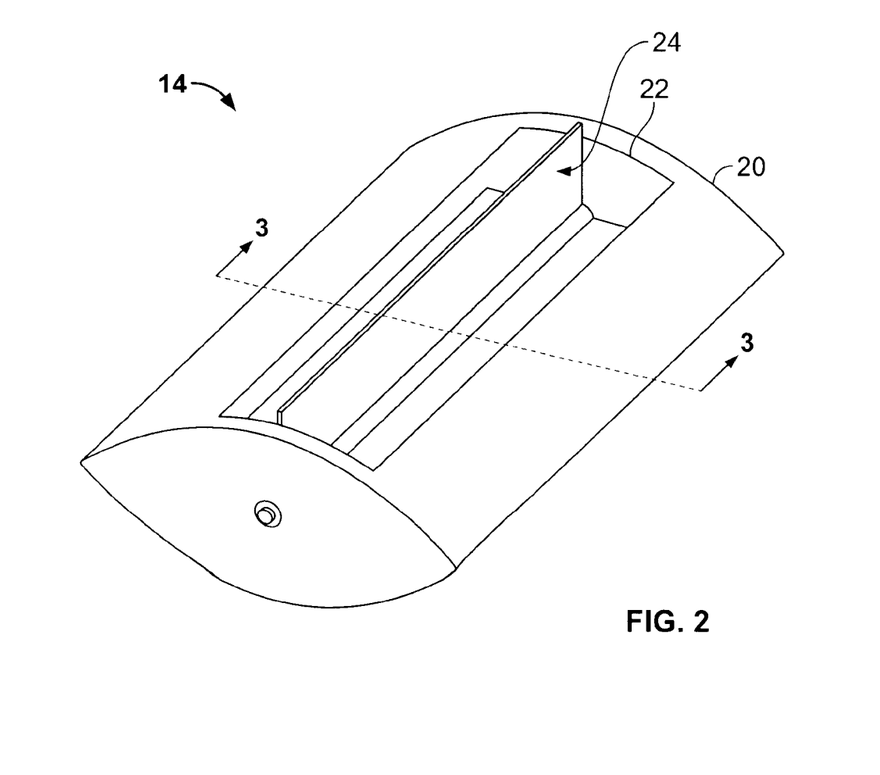
FIG. 2 is a shade element having a turbine element in accordance with an embodiment of the present disclosure.
Figure 3:
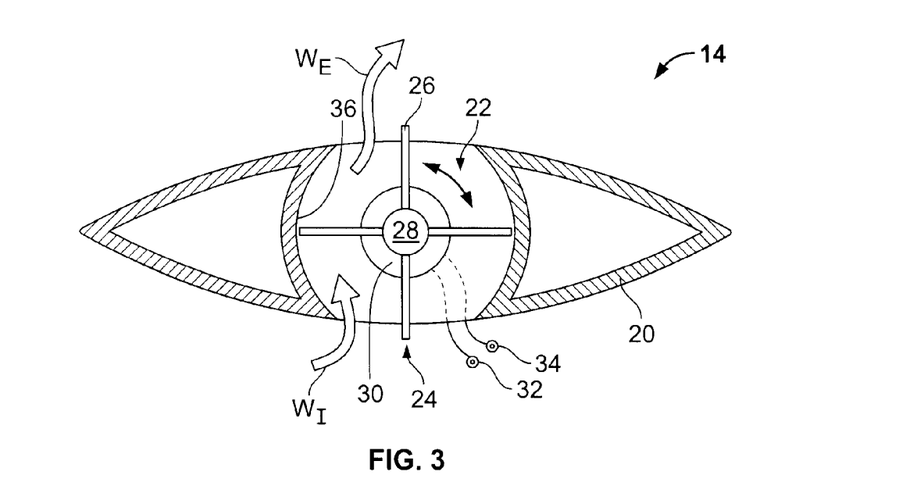
FIG. 3 is a cross-section of the shade element of FIG. 2 taken along section lines 3-3 and looking in the direction of the arrows.

FIGS. 2 and 3 show a shade 14 having a body 20 with an elliptic shape and a hollow 22 that accommodates a turbine 24. The turbine 24 has as plurality of blades 26 extending from a central axle 28. The central axle 28 may be supported at one or both ends by bearings (not shown) or by a generator/alternator 30 at one or both ends thereof, which allow the turbine 24 to be spun by the wind $W_I$ on the windward (pressure) side of the shade 14 and exhausted as $W_E$ on the leeward side. In moving from the windward side of the shade 14 to the leeward side, the kinetic energy of the wind $W_I$ is imparted to the turbine 24 and to the generator 30, which converts this energy into electrical potential present at terminals 32, 34. The blades 26 preferably pass close enough to interior wall 36 which defines the hollow 22 without rubbing to maximize the transfer of wind energy.

Figure 4:
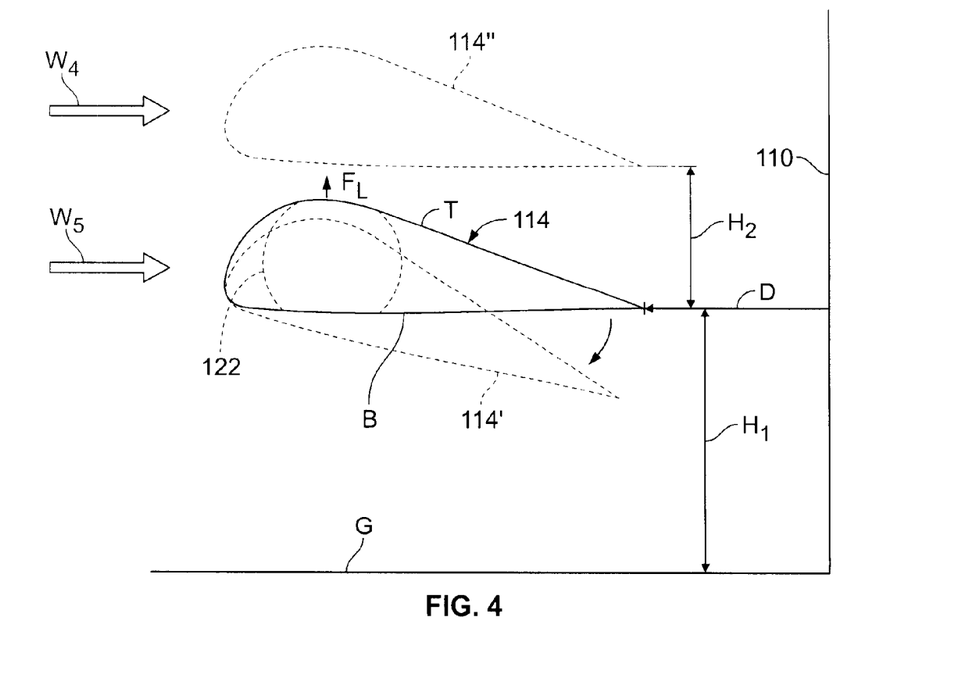
FIG. 4 is a diagrammatic end view of a shade element in accordance with an alternative embodiment of the present disclosure.

FIG. 4 shows an alternative shade 114 having an airfoil shape that generates lift in response to winds $W_4$ and/or $W_5$. The airfoil shape may be used to generate a lift or suction force $F_L$ that draws air through the hollow 122 from bottom surface B towards the top surface T to spin a turbine (not shown) like turbine 24. The angular orientation of the shade 114 may be adjusted to the wind direction to maximize efficiency as illustrated by shade 114'. In addition the height $H_1$ above the ground G may be adjusted to $H_2$. Similarly, the distance D from the building 110 may be varied to achieve better performance. FIG. 4 also illustrates that the shade 114 (or 14) may be grouped in arrays of a plurality of shades 114, 114".

Figure 5:
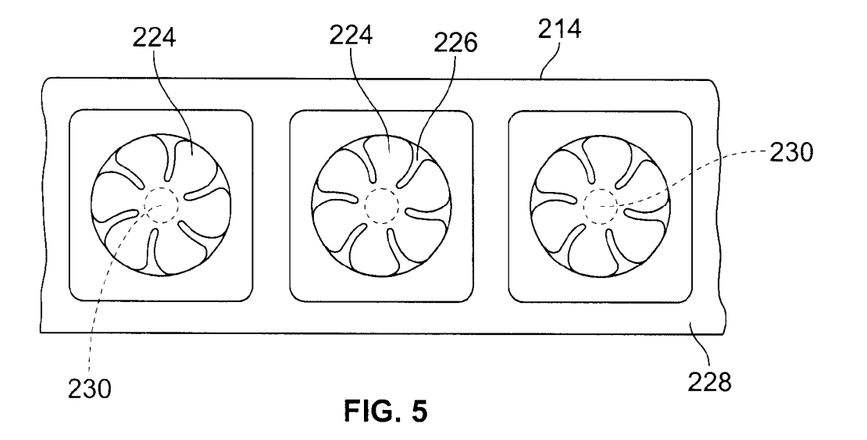
FIG. 5 is a top view of a bank of fans used in a shade element in accordance with an alternative embodiment of the present disclosure.

FIG. 5 shows an alternative shade 214 having a plurality of fans 224 installed along the length of the shade 214 in communication with corresponding aperture 226 extending through the shade 214. When air flows through the apertures 226 in response to a pressure gradient that arises between sides 228 and the opposite side (the opposite side not being shown) the fans 224 are turned, turning generators/alternators 230 (shown in dotted lines) thereby generating electrical potential.

Figure 6:
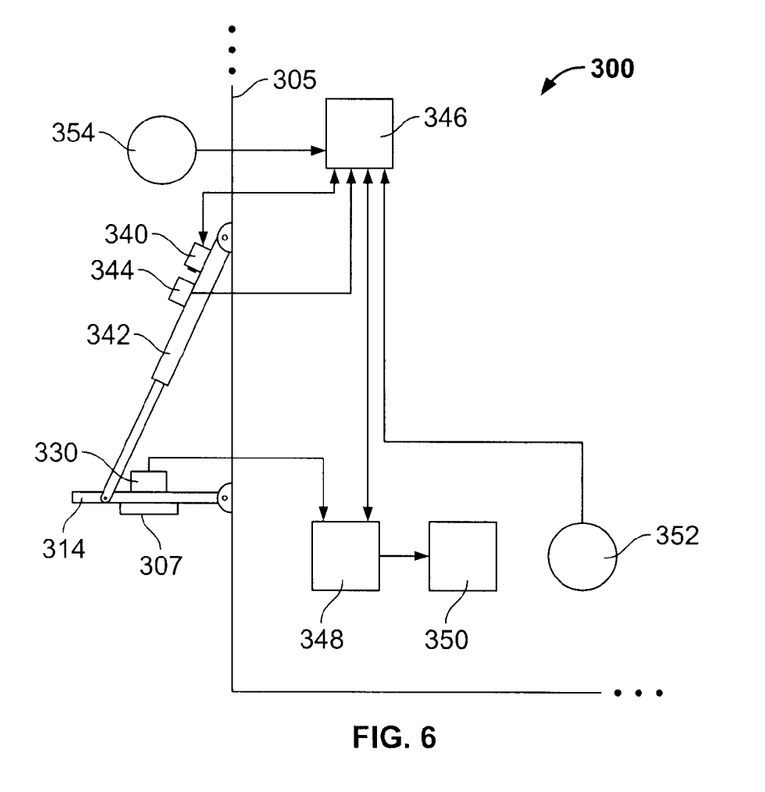
FIG. 6 is a diagram of a shade element and control system in accordance with an alternative embodiment of the present disclosure.

FIG. 6 is a diagram of a shade generator system 300 wherein a shade 314 is adjustably mounted to a structure 305, which may be a building or an independent structure positioned near a building. The shade 314 has a wind energy capturing device 307, such as a turbine or fan, like turbine 24 or fan 224 described above, coupled to a generator/alternator 330. The position of the shade 314 may be adjustable via an actuator motor 340 which controls the position of linkage 342, which may be mechanically or hydraulically driven. A position sensor 344 attached to the linkage 342 or otherwise positioned to sense on shade 314 position, may be utilized to relay the position of the shade to a micro-controller 346. The generator 330 output may be directed to a charging circuit 348, which may include a rectifier and a transformer to present an appropriate electrical output voltage/current to an electrical storage device 350, e.g., a battery. The charging circuit 348 may also communicate with the micro-controller 346 to provide data indicative of input from the generator/alternator 330 and data indicative of the output to the storage device 350. Based upon the sensed power received and output to/from the charging circuit 348, the microcontroller 346 may be programmed to adjust the position of the shade 314 to achieve greater electrical generation. Inputs from an internal photo-sensor 352 and an external anemometer 354 may also be received by a program executing in the micro-controller 346 to maximize energy savings by taking into consideration the effects of shade 314 position on internal heating/lighting of the building to which the system 300 is associated, as well as commanding potential adjustments to shade 314 position based upon wind direction and speed. An external photosensor (not shown) may also be employed to advise the microcontroller 346 of the direction of solar radiation (the position of the sun) relative to the shade 314, from which the microcontroller 346 may calculate the associated area that the shade 314 will effect.

The above described shade with wind-driven electrical generator extends the functionality of a shade 14, 214, 314 or a bank of such shades to another energy saving and beneficial purpose, viz., electric power generation. The use of a moveable, wind-driven element, e.g., a turbine 24 or fan 224, in the shade 14, 214, 314 extracts some of the force exerted by the wind which would otherwise impinge on a static portion of the shade. In accordance with the present disclosure, a significant portion of the force exerted by the wind is utilized by the wind-driven element. As compared to shades that feature solar panels, the electrical generating apparatus of the present disclosure is operable day or night, so long as there are moving air currents. In contrast, shades which utilize solar panels are operative in generating electricity only when exposed to solar radiation.

Figure 7:
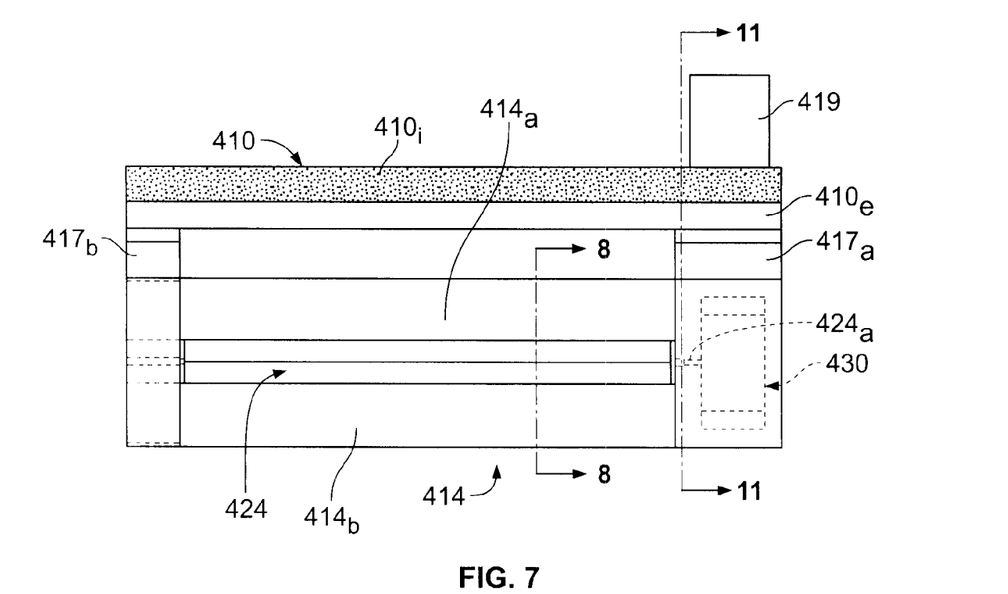
FIG. 7 is a partially diagrammatic top view of a shade element in accordance with an alternative embodiment of the present disclosure.
Figure 8:
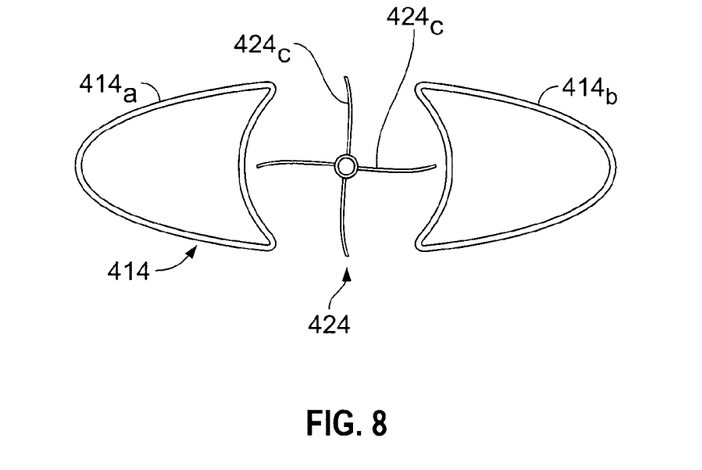
FIG. 8 is a cross-sectional view of the shade element of FIG. 7 taken along lines 8-8 and looking in the direction of the arrows.

FIGS. 7 and 8 show a shade 414, having spaced elements 414a, 414b. The elements 414a, 414b are held to a building 410 by brackets 417a, 417b, which optionally hold the elements 414a, 414b of the shade 414 in spaced relationship, e.g., by being welded or riveted thereto or received within mating recesses provided in the brackets 417a, 417b. The building 410 may feature an exterior facade 410e and an interior 410i. A turbine 424 rotatable on axle 424a is positioned between shade elements 414a, 414b with the axle 424a coupled to a generator 430 housed within bracket 417a. The axle 424a is rotatably retained in bracket 417b at the other end of the turbine 424, e.g., via an intermediating bearing, such as a ball bearing or a plain bearing (not shown). The turbine 424 has a plurality, e.g., four, blades 424c, which may have a curvature, as shown in FIG. 8. The generator 430 is connected to an electric unit 419 inside the building 410, which may include a battery for storing electrical power, a switch to control access to the electrical power stored in the battery, an AC inverter, etc.

Figure 9:
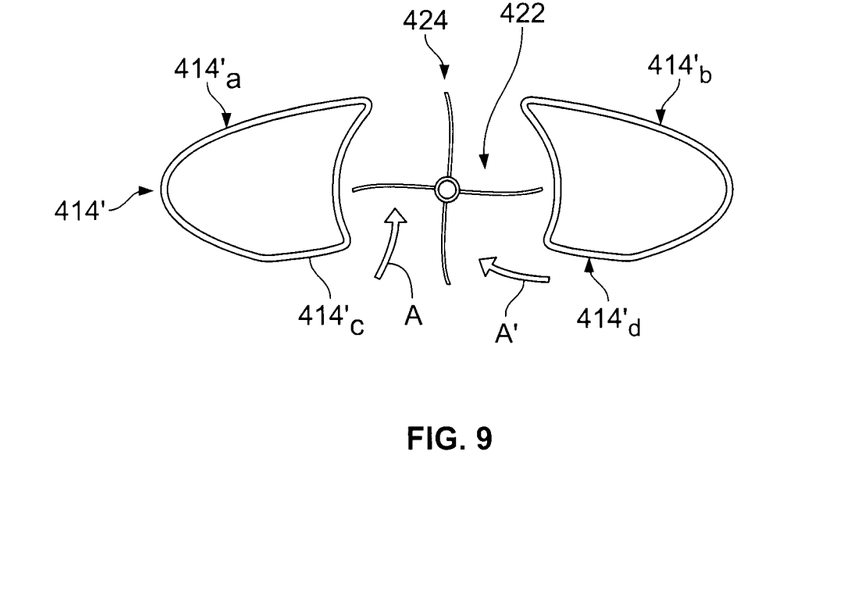
FIGS. 9 and 10 are cross-sectional views like FIG. 8, but of other alternative embodiments of the present disclosure.

FIG. 9 shows a shade 414' with elements 414'a, 414'b that each feature relieved edges 414'c and 414'd, respectively, that may promote airflows A (primarily upward direction), A' (with a horizontal component) through the hollow 422 to turn the turbine 424.

Figure 10:
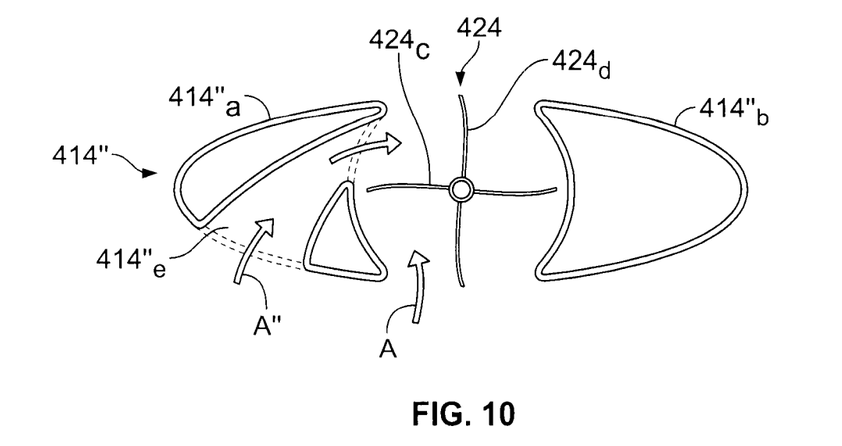

FIG. 10 shows a shade 414" with one element 414"a featuring one or more side passages 414"e that permits airflow A" to assist in turning the turbine 424. The side passage 414"e conducts a portion of the upwardly directed airflow A" inducing a direction change and directing it on a blade 424d of the turbine 424 advanced rotationally (clockwise) relative to the blade 424c. Besides changing direction, the passage 414e converges in the direction of airflow A" to increase the speed of air passing there through.

Figure 11:
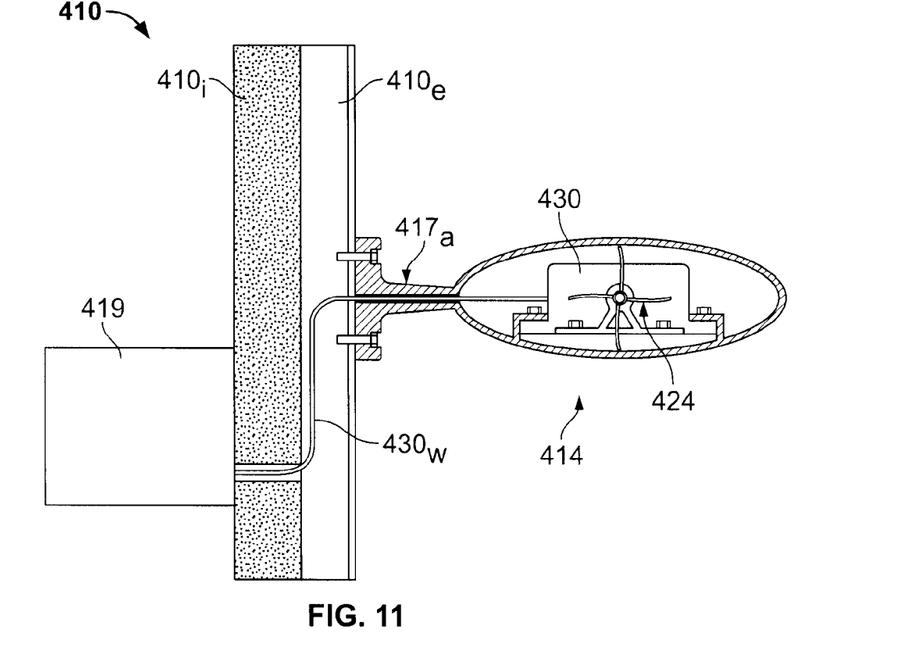
FIG. 11 is a cross-sectional view of the apparatus of FIG. 7, taken along lines 11-11 and looking in the direction of the arrows.

FIG. 11 shows the shade 414 of FIG. 7 in cross-section, with the generator 430 positioned within the bracket 417a and with a wire 430w extending from the generator 430 to the electrical unit 419 mounted to the interior 410i of the building 410.

Figure 12:
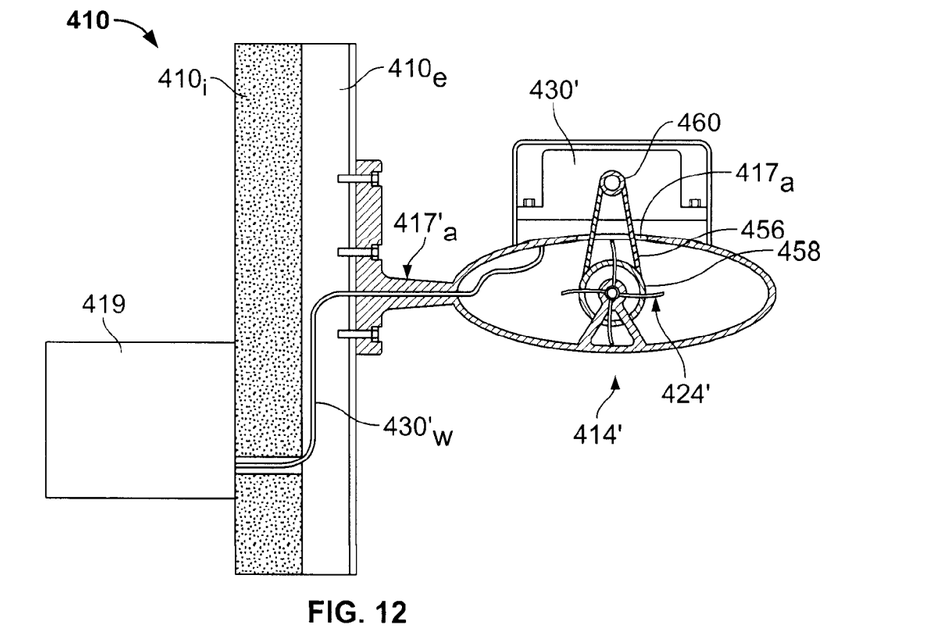
FIGS. 12 and 13 are cross-sectional views like FIG. 11, but of other alternative embodiments of the present disclosure.

FIG. 12 shows an alternative embodiment wherein the generator 430' is mounted on top of the bracket 417'a. A belt 456 extends through a slot 417s in the bracket 417'a and intermediates between a pulley 458 coupled to the turbine 424' and a pulley 460 coupled to the generator 430', allowing the turbine 424' to turn the generator 430'.

Figure 13:
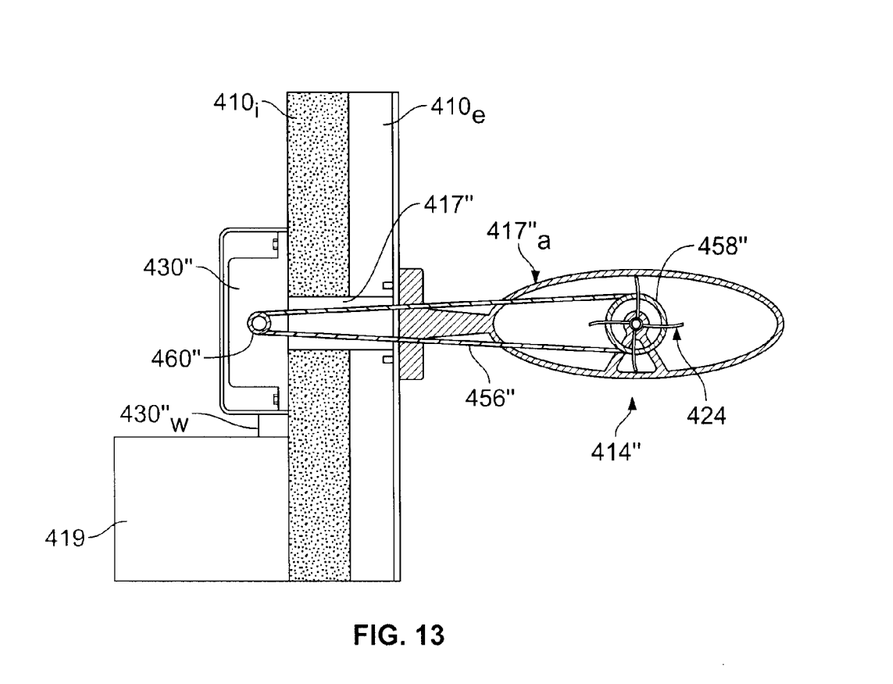

FIG. 13 shows an alternative embodiment wherein the generator 430" is mounted on the building interior 410i next to the electrical unit 419. A belt 456" extends through slot 417" passing through building interior 410i and exterior 410e and transmits motion between the pulley 458" on the turbine 424 and the pulley 460" on the generator 430".

Figure 14:
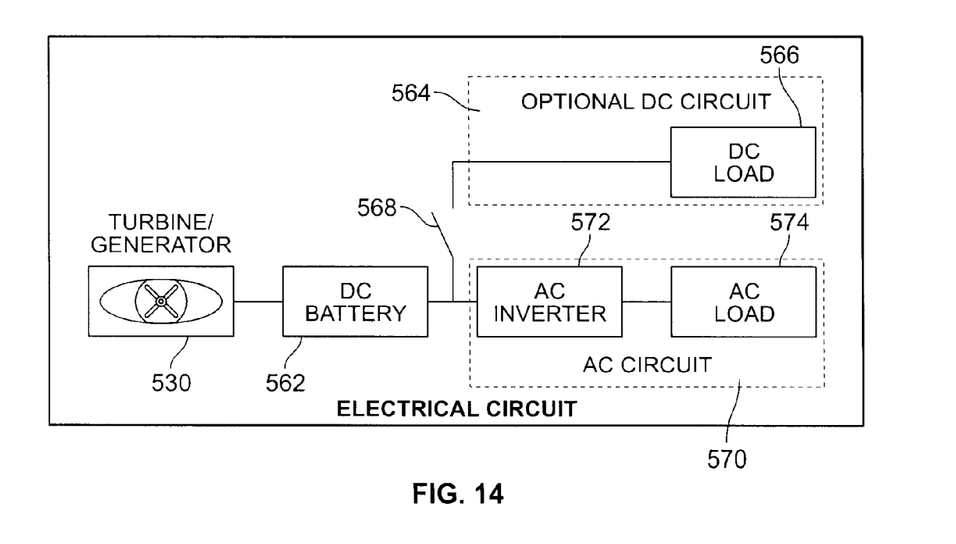
FIG. 14 is a high level electrical diagram in accordance with an alternative embodiment of the present disclosure.

FIG. 14 is a schematic of one embodiment of an electrical circuit that may be used in accordance with the present disclosure. A turbine driven generator 530 may be used to charge a battery (DC) 562, which can be selectively connected to an optional DC circuit 564 with DC load 566 via a switch 568. An AC circuit 570 connected to the battery 562, may include an AC inverter 572 for converting DC power to AC to supply power to an AC load 574.

Figure 15:
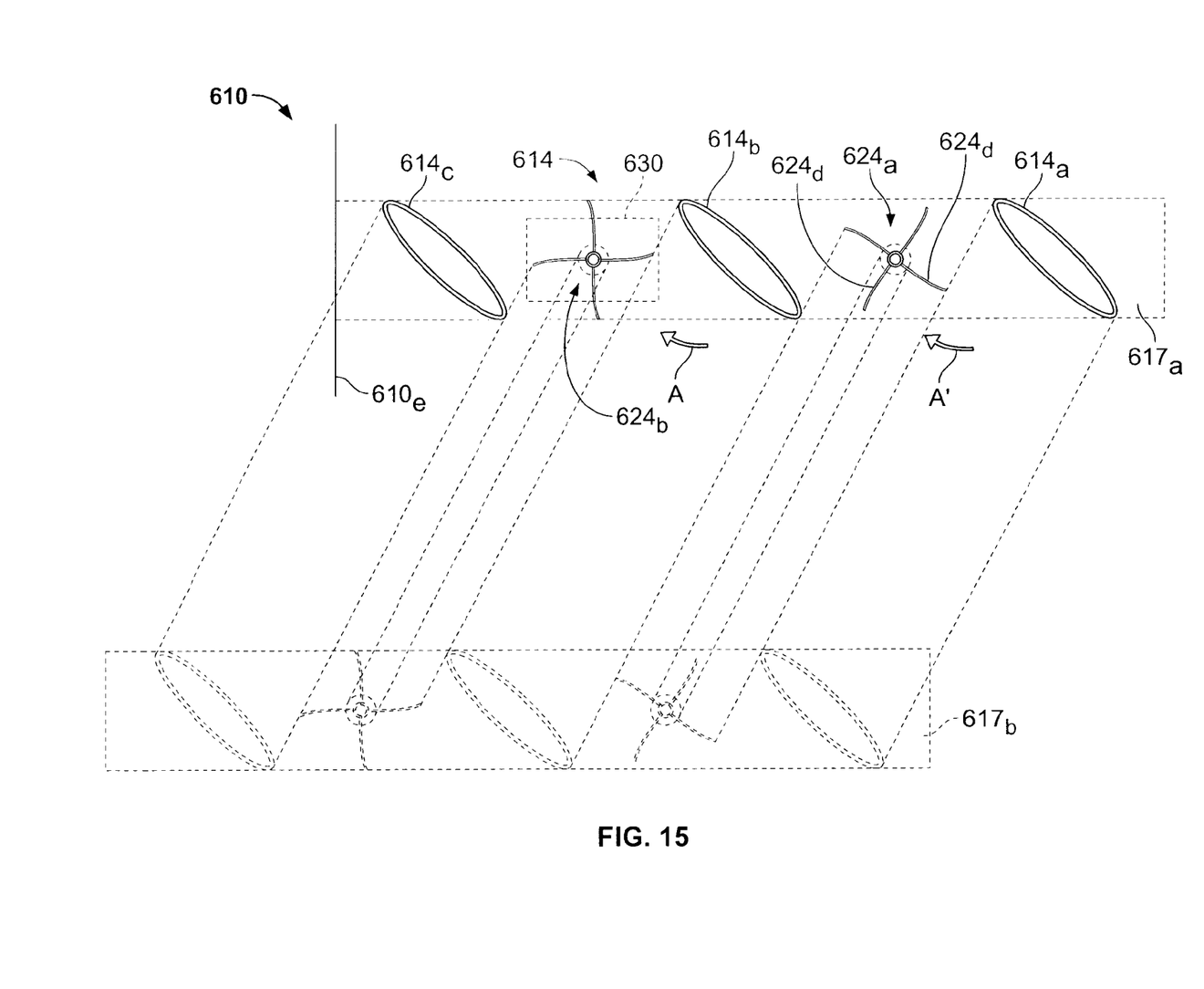
FIG. 15 is a diagrammatic cross-sectional view of a shade assembly in accordance with an alternative embodiment of the present disclosure.

FIG. 15 shows a shade assembly 614 having a plurality of shade elements 614a, 614b, 614c extending from a support bracket 617a (corresponding bracket 617b, which would support the other end of the shade elements 614a-c is shown in dotted lines). The support brackets 617a, 617b may be attached in parallel to the façade 610e of a building 610. A plurality of turbines 624a, 624b are rotatably supported by the brackets 617a, 617b and are coupled to one or more generators 630, e.g., in a manner similar to that described above in previously described embodiments. The shape and orientation of the elements 614a-c may be utilized to guide airflows A, A' towards the turbines 624a, 624b. Multiple turbines 624a, 624b may be utilized to capture more airflow and to produce more electricity. The turbine blades 624d may be made from a variety of materials, including aluminum alloys like aluminum lithium alloy and fiber reinforced polymer composites, such as a polymer reinforced with carbon or glass fibers.

It will be understood that the embodiments described herein are merely exemplary and that a person skilled in the art may make many variations and modifications without departing from the spirit and scope of the claimed subject matter. For example, the static portions of the shade may include solar panels that may also be used to generate electricity. The terminology generator was used for an apparatus that generates electricity. Alternatively, an alternator could be utilized as the electrical generating element. All such variations and modifications are intended to be included within the scope of the appended claims.

We claim:

1. A shade, comprising:
   a pair of spaced members held together by a pair of bridging members, a first bridging member coupled to the spaced members proximate one end thereof and a second bridging member coupled to the spaced members proximate a second end thereof, the pair of spaced members conjointly having an elliptical cross-sectional shape;
   a mounting bracket extending from the shade for mounting the shade to a building;
   a turbine with a plurality of blades extending at least partially across the space between the pair of members, rotatably coupled to the shade and positioned between the spaced members with the rotational axis parallel to the direction of extension of the spaced members between the first and second bridging members, opposing surfaces of the pair of spaced members defining a hollow having an interior curvature approximating the circumference of the circle traced by the turbine blades when the turbine is moved; the turbine capable of moving in response to moving air; and
   an electric generator coupled to the turbine, the generator capable of generating electricity when the turbine is moved.

2. The shade of claim 1, wherein the shade has an airfoil shape with the hollow occupying a position proximate the area of the airfoil which generates lift in response to air flow over the airfoil shape.

3. The shade of claim 1, wherein the generator is coupled to an end of the turbine.

4. The shade of claim 1, wherein at least one edge of the shade at the conjunction of the hollow and the elliptical shape being relieved.

5. The shade of claim 1, wherein the shade has at least one passage extending from the hollow to an exterior surface of the shade.

6. The shade of claim 1, wherein the shade is adjustably mounted to the building to allow repositioning the shade.

7. The shade of claim 6, further comprising an actuator for moving the shade to a selected position.

8. The shade of claim 7, further comprising a sensor responsive to wind energy and
   a controller, the sensor providing an output representative of the energy to the controller and the controller having logic which interprets the sensor output and produces a control signal to the actuator to move the shade to a position determined by the logic of the controller.

9. The shade of claim 1, wherein the shade is pivotally mounted at at least one end and the angle thereof relative to a surface of the building is controlled by a support of variable length.

10. The shade of claim 1, wherein the generator is mounted on the shade.

11. The shade of claim 1, wherein the generator is mounted on the building.

12. The shade of claim 1, further including a motion transfer linkage.

13. The shade of claim 12, wherein the motion transfer linkage includes a first pulley attached to the turbine and a second pulley attached to the generator with a belt passing between the first and second pulleys.

14. The shade of claim 1, further comprising a plurality of spaced shades with turbine elements.

15. The shade of claim 1, further including a storage battery and wherein the generator is used to charge the battery.

16. The shade of claim 1, further including an electrical conversion device to convert electricity generated in one form to another form of electricity for at least one of storage and application to a load.

17. The shade of claim 1, wherein the pair of spaced members are capable of guiding light, effecting the sunlight entering the building through an opening therein.

18. A shade, comprising:
    a pair of spaced members held together by a pair of bridging members, a first bridging member coupled to the spaced members proximate one end thereof and a second bridging member coupled to the spaced members proximate a second end thereof, the pair of spaced members conjointly having an elliptical cross-sectional shape;
    a mounting bracket extending from the shade for mounting the shade to a building;
    a turbine with a plurality of blades extending at least partially across the space between the pair of members, rotatably coupled to the shade and positioned between the spaced members with the rotational axis parallel to the direction of extension of the spaced members between the first and second bridging members, opposing surfaces of the pair of spaced members defining a hollow having an interior curvature approximating the curvature of the circle traced by the turbine blades when the turbine is moved; the turbine capable of moving in response to moving air; and
    an electric generator coupled to the turbine, the generator capable of generating electricity when the turbine is moved.

* * * * *